(12) United States Patent
Yin et al.

(10) Patent No.: US 11,230,206 B2
(45) Date of Patent: Jan. 25, 2022

(54) METHOD AND DEVICE FOR ADJUSTING POSITION OF SEAT IN VEHICLE

(71) Applicants: BEIJING AUTOMOTIVE GROUP CO. LTD, Beijing (CN); BEIJING AUTOMOBILE RESEARCH INSTITUTE CO., LTD., Beijing (CN)

(72) Inventors: Yuen Yin, Beijing (CN); Yue Liu, Beijing (CN); Wenwei Jia, Beijing (CN)

(73) Assignees: BEIJING AUTOMOTIVE GROUP CO. LTD, Beijing (CN); BEIJING AUTOMOBILE RESEARCH INSTITUTE CO., LTD., Beijing (CN)

( * ) Notice: Subject to any disclaimer, the term of this patent is extended or adjusted under 35 U.S.C. 154(b) by 347 days.

(21) Appl. No.: 16/480,928

(22) PCT Filed: May 24, 2017

(86) PCT No.: PCT/CN2017/085678
§ 371 (c)(1),
(2) Date: Jul. 25, 2019

(87) PCT Pub. No.: WO2018/152979
PCT Pub. Date: Aug. 30, 2018

(65) Prior Publication Data
US 2019/0389330 A1 Dec. 26, 2019

(30) Foreign Application Priority Data
Feb. 24, 2017 (CN) .......................... 201710104301.2

(51) Int. Cl.
*A47C 31/00* (2006.01)
*B60N 2/02* (2006.01)
(Continued)

(52) U.S. Cl.
CPC .......... *B60N 2/0244* (2013.01); *A47C 31/126* (2013.01); *B60Q 9/00* (2013.01); *B60R 16/037* (2013.01); *B60N 2002/0268* (2013.01)

(58) Field of Classification Search
None
See application file for complete search history.

(56) References Cited

U.S. PATENT DOCUMENTS 8,256,842 B2 9/2012 Himmelhuber et al.
2003/0004628 A1* 1/2003 Rennaker .......... B60R 21/01556
701/45
(Continued)

FOREIGN PATENT DOCUMENTS

CN 101670817 A 3/2010
CN 102874134 A 1/2013
(Continued)

*Primary Examiner* — James M McPherson
(74) *Attorney, Agent, or Firm* — Hayes Soloway PC

(57) ABSTRACT

Methods and devices for adjusting the position of a seat in a vehicle are described herein. The methods include obtaining pressure values output by a plurality of sub-sensors; calculating a mean square value and an average value of the pressure values output by the sub-sensors; judging whether a ratio of the mean square value to the average value is greater than a preset value; obtaining pressure values output by a front pressure sensor, a rear pressure sensor, a left pressure sensor and a right pressure sensor when the ratio of the mean square value to the average value is greater than the preset value; adjusting fore-and-aft positions of the seat according to the pressure values output by the front pressure sensor and the rear pressure sensor; and adjusting lateral positions of the seat according to the pressure values output by the left pressure sensor and the right pressure sensor.

16 Claims, 6 Drawing Sheets

(51) Int. Cl.
  *A47C 31/12* (2006.01)
  *B60Q 9/00* (2006.01)
  *B60R 16/037* (2006.01)

(56) References Cited

U.S. PATENT DOCUMENTS

2010/0276973 A1 * 11/2010 Zenk .................. B60N 2/914
                                                          297/284.3
2017/0043681 A1    2/2017 Seiller et al.

FOREIGN PATENT DOCUMENTS

| CN | 104260647 A | 1/2015 |
| CN | 204774761 U | 11/2015 |
| CN | 106143370 A | 11/2016 |
| CN | 106394320 A | 2/2017 |
| CN | 206465807 U | 9/2017 |
| JP | 2005212496 A | 8/2005 |
| JP | 2006084356 A | 3/2006 |

* cited by examiner

METHOD AND DEVICE FOR ADJUSTING POSITION OF SEAT IN VEHICLE

CROSS-REFERENCE TO RELATED APPLICATIONS AND PRIORITY

The present application is a U.S. National Phase of International Patent Application Serial No. PCT/CN2017/085678 filed May 24, 2017, which claims priority from CN Application No. 201710104301.2 filed Feb. 24, 2017. The entire contents of the above-cited applications are hereby incorporated by reference in their entirety for all purposes.

FIELD OF THE INVENTION

The present disclosure relates to the field of vehicle seat control technology, in particular to a method and device for adjusting the position of a seat in a vehicle.

BACKGROUND OF THE INVENTION

Nowadays, a growing number of car rental companies are springing up due to the influence of license plate restriction policy in big cities and the rise of self-driving tourism, and a large number of people are also willing to enjoy the convenience brought by short-term car rental, which, however, poses a big problem that rented cars are often driven by drivers of various heights and weights, who have different requirements on a seat position: those who are tall call for a lower seat while those who are short may want a higher one. Car seats of rented cars, as a result, need to be adjusted again and again after each drive to meet requirements of different drivers for seat positions.

Pressure sensors disclosed in the prior art are evenly distributed in a matrix form, which has the following problems:

I. Pressure sensors are distributed too densely at an edge where no stress exists, which is a waste of sensors, but they are sparsely distributed at a center where stress is concentrated, causing significantly different pressure values on sensors at the center. Serious errors will therefore occur in the calculation of the stress, and a seat cannot be adjusted to the most comfortable position for the driver as a result; and II. The need for a large number of pressure sensors increases seat costs.

SUMMARY OF THE INVENTION

An object of the present disclosure is to provide a method and device for adjusting a position of a seat in a vehicle to the most comfortable position for drivers, which is impossible with the prior art.

In order to achieve the above object, the present disclosure provides a method for adjusting position of a seat in a vehicle, a method for adjusting the position of a seat in a vehicle, and a method for adjusting the position of a seat in a vehicle, wherein front, rear, left, right and central areas of a seat face are respectively provided with a front pressure sensor, a rear pressure sensor, a left pressure sensor, a right pressure sensor, and a pressure sensor ring which comprises a plurality of sub-sensors distributed in a circular manner. The method comprises:

obtaining pressure values output by the sub-sensors;
calculating a mean square value and an average value of the pressure values output by the sub-sensors;
judging whether a ratio of the mean square value to the average value is greater than a preset value;
obtaining pressure values output by the front pressure sensor, the rear pressure sensor, the left pressure sensor and the right pressure sensor when the ratio of the mean square value to the average value is greater than the preset value;
adjusting fore-and-aft positions of the seat according to the pressure values output by the front pressure sensor and the rear pressure sensor; and
adjusting lateral positions of the seat according to the pressure values output by the left pressure sensor and the right pressure sensor.

Optionally, the adjusting fore-and-aft positions of the seat according to the pressure values output by the front pressure sensor and the rear pressure sensor comprises:

comparing the pressure values output by the front pressure sensor and the rear pressure sensor to obtain a first comparison value; and
adjusting fore-and-aft positions of the seat according to the first comparison value.

Optionally, the first comparison value is equal to a ratio of the pressure value output by the front pressure sensor to the pressure value output by the rear pressure sensor;

The adjusting fore-and-aft positions of the seat according to the first comparison value comprises:

maintaining a current position of the seat in the front-rear direction when the first comparison value is greater than or equal to a backward-adjusting threshold and less than or equal to a forward-adjusting threshold;
controlling the seat to move backward when the first comparison value is less than the backward-adjusting threshold; and
controlling the seat to move forward when the first comparison value is greater than the forward-adjusting threshold.

Optionally, the adjusting lateral positions of the seat according to the pressure values output by the left pressure sensor and the right pressure sensor comprises:

comparing the pressure values output by the left pressure sensor and the right pressure sensor to obtain a second comparison value; and
adjusting lateral positions of the seat according to the second comparison value.

Optionally, the second comparison value is equal to a ratio of the pressure value output by the left pressure sensor to the pressure value output by the right pressure sensor;

the adjusting lateral positions of the seat according to the second comparison value comprises:

maintaining a current position of the seat in the left-right direction when the second comparison value is greater than or equal to a rightward-adjusting threshold and less than or equal to a leftward-adjusting threshold;
controlling the seat to move left when the second comparison value is greater than the leftward-adjusting threshold; and
controlling the seat to move right when the second comparison value is less than the rightward-adjusting threshold.

Optionally, the controlling the seat to move left when the second comparison value is greater than the leftward-adjusting threshold comprises:

outputting a first prompt message which is used to prompt a user sitting on the seat to move right;
judging whether the second comparison value changes in a first preset period; and
controlling the seat to move left when the second comparison value does not change in the first preset period.

Optionally, the controlling the seat to move right when the second comparison value is less than the rightward-adjusting threshold comprises:

outputting a second prompt message which is used to prompt a user sitting on the seat to move left;

judging whether the second comparison value changes in a second preset period; and controlling the seat to move right when the second comparison value does not change in the second preset period.

Optionally, the method also comprises:

locking a position of the seat when a ratio of the mean square value to the average value is less than or equal to the preset value so that the seat does not move.

The present disclosure also provides a device for adjusting the position of a seat in a vehicle, where front, rear, left, right and central areas of a seat face are respectively provided with a front pressure sensor, a rear pressure sensor, a left pressure sensor, a right pressure sensor, and a pressure sensor ring which comprises a plurality of sub-sensors distributed in a circular manner. The device comprises:

a second acquisition module for obtaining pressure values output by the sub-sensors;

a calculating module for calculating a mean square value and an average value of the pressure values output by the sub-sensors;

a judging module for judging whether a ratio of the mean square value to the average value is greater than a preset value;

a first acquisition module for obtaining pressure values output by the front pressure sensor, the rear pressure sensor, the left pressure sensor and the right pressure sensor when the ratio of the mean square value to the average value is greater than a preset value;

a first adjusting module for adjusting fore-and-aft positions of the seat according to pressure values output by the front pressure sensor and the rear pressure sensor; and a second adjusting module for adjusting lateral positions of the seat according to the pressure values output by the left pressure sensor and the right pressure sensor.

Optionally, the first adjusting module comprises:

a first comparison submodule for comparing pressure values output by the front pressure sensor and the rear pressure sensor to obtain a first comparison value; and a first adjusting submodule for adjusting fore-and-aft positions of the seat according to the first comparison value.

Optionally, the first comparison value is equal to a ratio of the pressure value output by the front pressure sensor to the pressure value output by the rear pressure sensor;

the first adjusting submodule is specifically used for:

maintaining a current position of the seat in the front-rear direction when the first comparison value is greater than or equal to a backward-adjusting threshold and less than or equal to a forward-adjusting threshold;

controlling the seat to move backward when the first comparison value is less than the backward-adjusting threshold; and controlling the seat to move forward when the first comparison value is greater than the forward-adjusting threshold.

Optionally, the second adjusting module comprises:

a second comparison submodule for comparing the pressure values output by the left pressure sensor and the right pressure sensor to obtain a second comparison value; and a second adjusting submodule for adjusting lateral positions of the seat according to the second comparison value.

Optionally, the second comparison value is equal to a ratio of the pressure value output by the left pressure sensor to the pressure value output by the right pressure sensor;

the second adjusting submodule is specifically used for:

maintaining a current position of the seat in the left-right direction when the second comparison value is greater than or equal to a rightward-adjusting threshold and less than or equal to a leftward-adjusting threshold;

controlling the seat to move left when the second comparison value is greater than the leftward-adjusting threshold; and controlling the seat to move right when the second comparison value is less than the rightward-adjusting threshold.

Optionally, the second adjusting submodule comprises:

a first output submodule for outputting a first prompt message which is used to prompt a user sitting on the seat to move right when the second comparison value is greater than the leftward-adjusting threshold;

a first judging submodule for judging whether the second comparison value changes in a first preset period; and a first control submodule for controlling the seat to move left when the second comparison value does not change in the first preset period.

Optionally, the second adjusting submodule comprises:

a second output submodule for outputting a second prompt message which is used to prompt a user sitting on the seat to move left when the second comparison value is less than the rightward-adjusting threshold;

a second judging submodule for judging whether the second comparison value changes in a second preset period; and a second control submodule which controls the seat to move right when the second comparison value does not change in the second preset period.

Optionally, the device also comprises:

a locking module for locking a position of a seat when a ratio of the mean square value to the average value is less than or equal to the preset value so that the seat does not move.

The technical proposal provided in embodiments of the present disclosure may have the following beneficial effects:

The present disclosure not only reduces costs as less pressure sensors are needed, but also optimizes the method for seat positions by adjusting a seat to the most comfortable position for a driver, which is impossible with the prior art.

Other features and advantages of the present disclosure will be described in detail in Detailed Description of the Embodiments below.

BRIEF DESCRIPTION OF THE DRAWINGS

The accompanying drawings, which are intended to provide a further understanding of the present disclosure and constitute a part of this specification, serve to explain the present disclosure together with Detailed Description of the Embodiments below, but do not constitute limitations to the present disclosure. In the drawings.

DETAILED DESCRIPTION OF THE PREFERRED EMBODIMENTS

Exemplary embodiments are described in detail here, examples of which are illustrated in the accompanying drawings. When the following description refers to the accompanying drawings, unless otherwise indicated, the same numbers in different drawings represent the same or similar elements. The embodiments described in the following exemplary embodiments do not represent all embodiments consistent with the present disclosure. On the contrary, the embodiments are only examples of devices and methods consistent with some of the aspects, as detailed in the attached claims, of the present disclosure.

Figure 2:
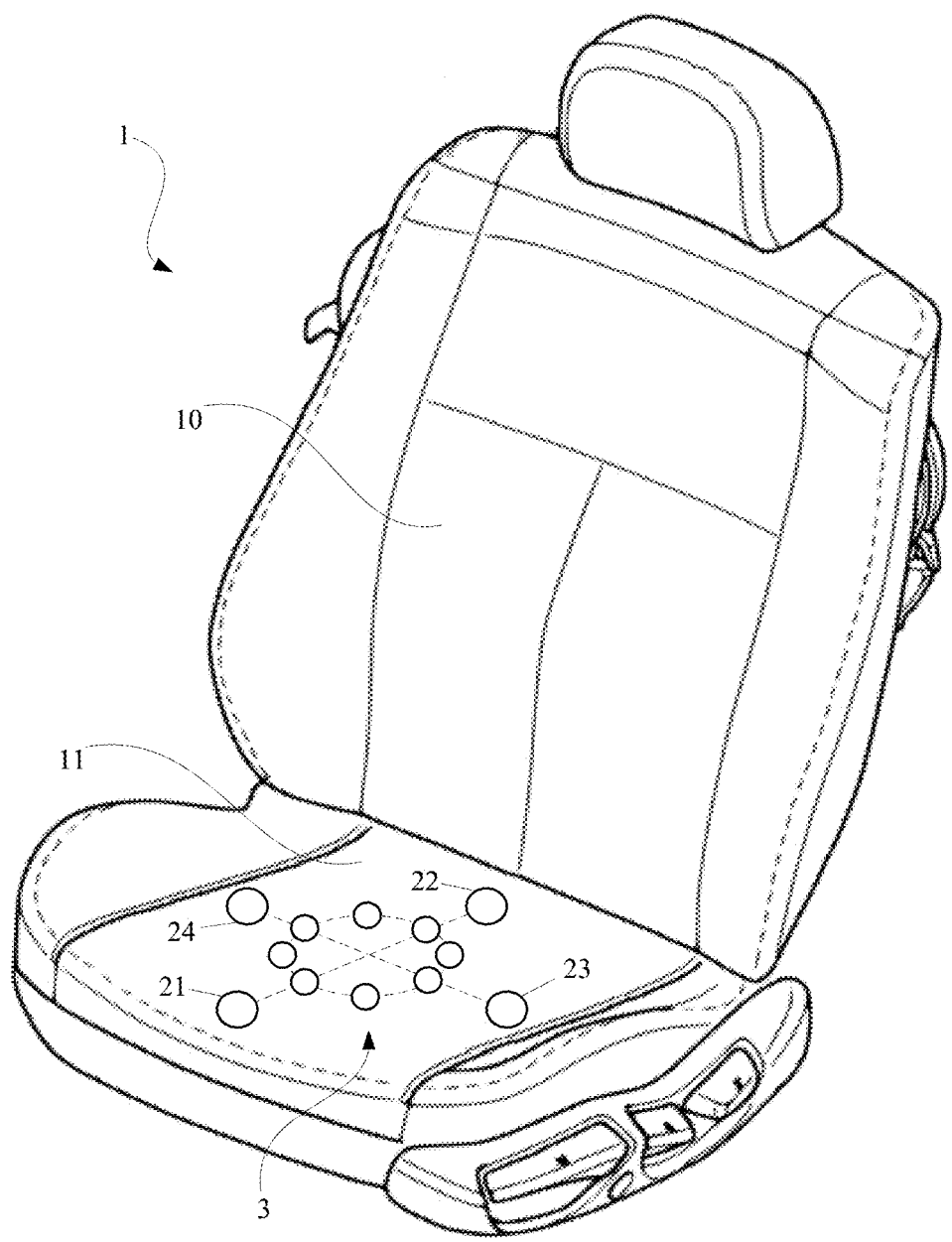
FIG. 2 is a structure diagram of a vehicle seat as shown in accordance with an exemplary embodiment.
Figure 3:
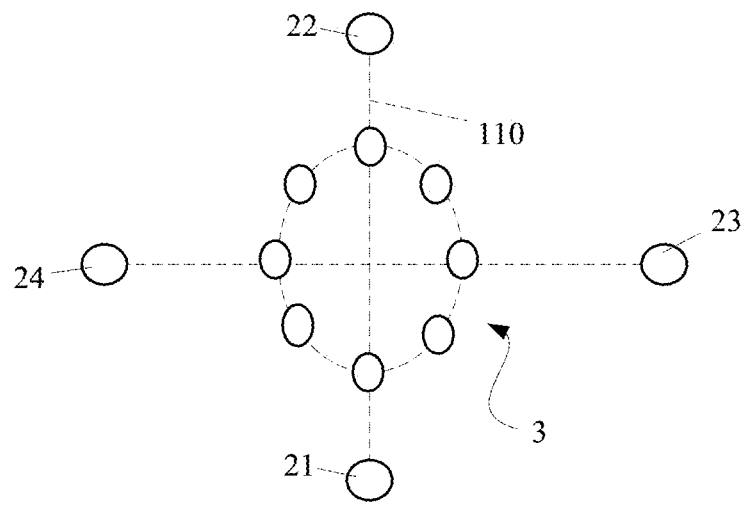
FIG. 3 is a top view of the distribution of sensors in FIG. 2.

Please refer to FIG. 2 and FIG. 3. FIG. 2 is a structure diagram of a vehicle seat shown in accordance with an exemplary embodiment. FIG. 3 is a top view of the distribution of sensors in FIG. 2.

As shown in FIG. 2 and FIG. 3, the seat 1 comprises a seat back 10 and a seat face 11. The front, rear, left and right parts of the seat face 11 are respectively provided with a front pressure sensor 21, a rear pressure sensor 22, a left pressure sensor 23 and a right pressure sensor 24. The central area of the seat face 11 is also provided with a pressure sensor ring 3 which comprises a plurality of sub-sensors distributed in a circular manner, wherein the front pressure sensor 21, the rear pressure sensor 22, the left pressure sensor 23, the right pressure sensor 24 and the pressure sensor ring 3 may be spread on the surface of the seat face 11 or embedded inside the seat face 11.

Preferably, as shown in FIG. 2 and FIG. 3, the front pressure sensor 21 and the rear pressure sensor 22 are arranged on a center line 110 of the seat face 11, and the left pressure sensor 23 and the right pressure sensor 24 are respectively arranged on the left and right sides of the center line 110 of the seat face 11. Further, the front pressure sensor 21, the rear pressure sensor 22, the left pressure sensor 23 and the right pressure sensor 24 are distributed in a parallelogram on the seat face 11. By arranging the four pressure sensors on the seat face 11 in the above manner of distribution, required pressure data can be collected with a small number of pressure sensors, thus saving costs.

Figure 1:
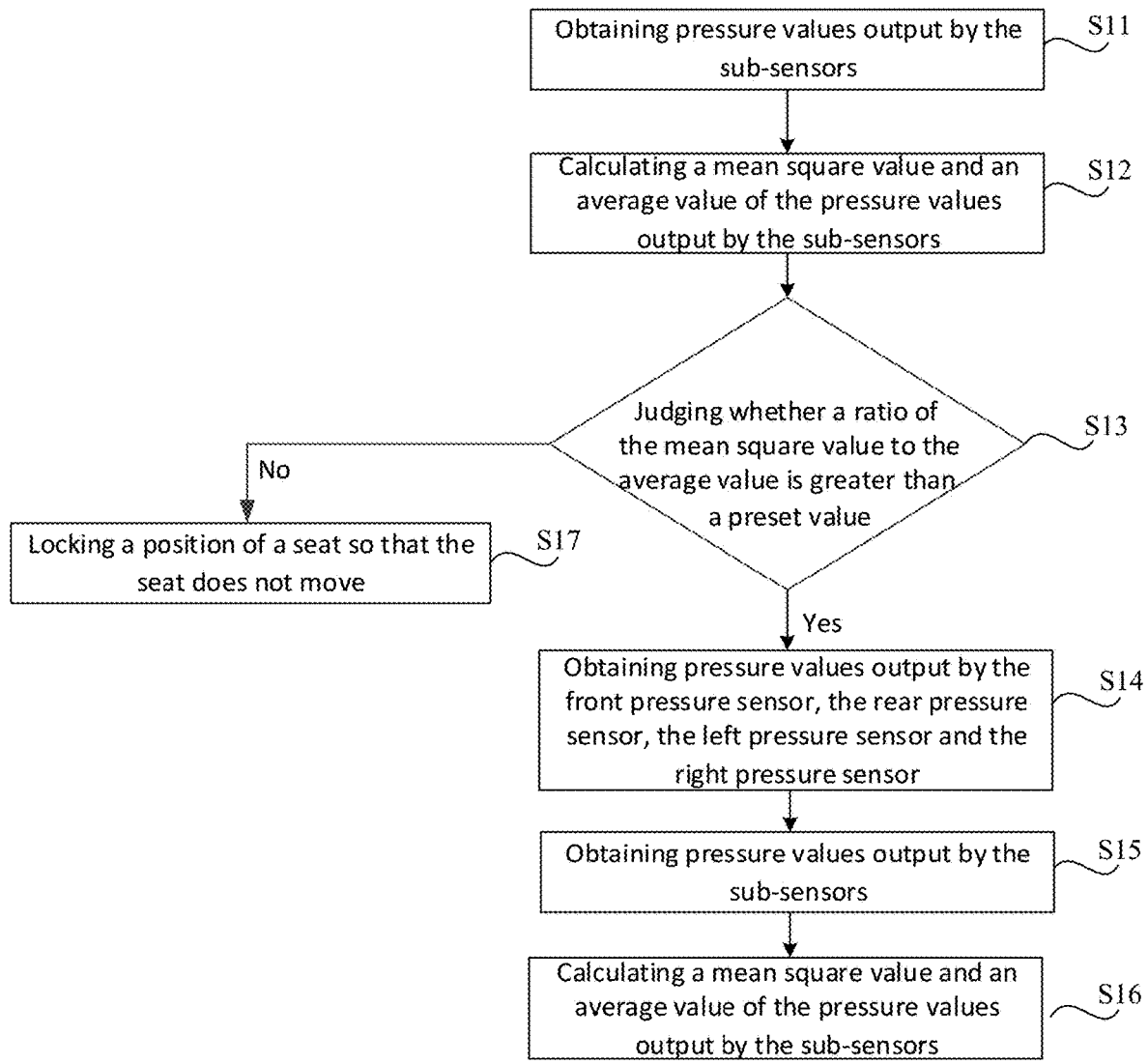
FIG. 1 is a flowchart illustrating a method for adjusting the position of a seat in a vehicle according to an exemplary embodiment.

Please refer to FIG. 1 and FIG. 2. FIG. 1 is a flowchart illustrating a method for adjusting the position of a seat in a vehicle according to an exemplary embodiment. As shown in FIG. 1 and FIG. 2, the method comprises the following steps:

Step S11: obtaining pressure values output by the sub-sensors;

Step S12: calculating a mean square value and an average value of the pressure values output by the sub-sensors;

Step S13: judging whether a ratio of the mean square value to the average value is greater than a preset value;

Step S14: obtaining pressure values output by the front pressure sensor 21, the rear pressure sensor 22, the left pressure sensor 23 and the right pressure sensor 24 when a ratio of the mean square value to the average value is greater than the preset value;

Step S15: adjusting fore-and-aft positions of the seat 1 according to the pressure values output by the front pressure sensor 21 and the rear pressure sensor 22;

Step S16: adjusting lateral positions of the seat 1 according to the pressure values output by the left pressure sensor 23 and the right pressure sensor 24; and Step S17: locking a position of the seat 1 when a ratio of the mean square value to the average value is less than or equal to the preset value so that the seat 1 does not move.

As shown in FIG. 2 and FIG. 3, the sub-sensors of the pressure sensor ring 3 are distributed in a circular manner, and preferably, in a circular and equidistant manner. The number of the sub-sensors may be four, and two of the sub-sensors are located on a center line of the seat face 11. Preferably, the number of the sub-sensors is eight, and four of the sub-sensors are located on the center line 110 of the seat face 11, as illustrated in FIG. 2 and FIG. 3.

The preset value may range from 1.9 to 2.1, and is preferably set to be 2. The present disclosure calculates a mean square value and an average value of the pressure values output by the sub-sensors, and determines whether a ratio of the mean square value to the average value is greater than a preset value. When a ratio of the mean square value to the average value is greater than 2, for example, it indicates that all sub-sensors of the pressure sensor ring bear uneven forces, which happens only if a driver is not at a right position on a seat, therefore the seat needs to be adjusted.

Whenever it is determined that a seat needs to be adjusted, the present disclosure only needs to collect pressure values output by the front pressure sensor 21, the rear pressure sensor 22, the left pressure sensor 23 and the right pressure sensor 24 by reasonably arranging the pressure sensors on the seat face 11, and adjust fore-and-aft positions of the seat 1 according to the pressure values collected, wherein lengthwise positions (i.e., fore-and-aft positions) of the seat 1 in the front-rear direction need to be adjusted only according to the pressure values output by the front pressure sensor 21 and the rear pressure sensor 22, and lateral positions (i.e., left-right positions) of the seat 1 in the left-right direction need to be adjusted only according to the pressure values output by the left pressure sensor 23 and the right pressure sensor 24.

When a ratio of the mean square value to the average value is less than or equal to the preset value, less than or equal to 2 for example, it indicates that all sub-sensors of the pressure sensor ring bear even forces, which happens only if a driver is at a right position on a seat, therefore the seat position needs to be locked, instead of being adjusted, to prevent the seat from moving. In this way, the method for positioning of a vehicle seat is further optimized.

The present disclosure not only reduces costs as less pressure sensors are needed, but also optimizes the method for adjusting seat positions by adjusting a seat to the most comfortable position for a driver, which is impossible with the prior art.

Figure 4:
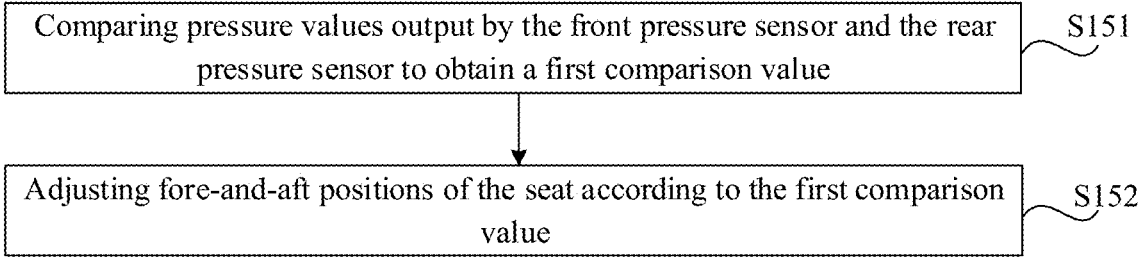
FIG. 4 is a flowchart showing adjusting front and rear positions of a seat included in a method for adjusting the position of a seat in a vehicle shown according to an exemplary embodiment.

FIG. 4 is a flowchart showing adjustment of front and rear positions of a seat included in a method for adjusting the position of a seat in a vehicle according to an exemplary embodiment. As illustrated by FIG. 4, the adjusting fore-and-aft positions of the seat according to the pressure values output by the front pressure sensor 21 and the rear pressure sensor 22 comprises the following steps:

Step S151: comparing the pressure values output by the front pressure sensor 21 and the rear pressure sensor 22 to obtain a first comparison value; and Step S152: adjusting fore-and-aft positions of the seat 1 according to the first comparison value.

The first comparison value is equal to a ratio of the pressure value output by the front pressure sensor 21 to the pressure value output by the rear pressure sensor 22. In Step 152, the adjusting fore-and-aft positions of the seat 1 according to the first comparison value may comprise: maintaining a current position of the seat 1 in the front-rear direction when the first comparison value is greater than or equal to a backward-adjusting threshold and less than or equal to a forward-adjusting threshold; controlling the seat 1 to move backward when the first comparison value is less than the backward-adjusting threshold; controlling the seat 1 to move forward when the first comparison value is greater than the forward-adjusting threshold. The backward-adjusting threshold may range from 0.85 to 0.99 and the forward-adjusting threshold may range from 1.00 to 1.15. Preferably, the backward-adjusting threshold is 0.95 and the forward-adjusting threshold is 1.05.

For instance, when the first comparison value is greater than or equal to 0.95 and less than or equal to 1.05, a fore-and-aft position of the seat 1 may be considered to be so appropriate that there is no need to adjust the fore-and-aft position of the seat 1.

When the first comparison value is less than 0.95, the seat 1 is adjusted backward for a certain distance, 1 cm for example. Next, the step of obtaining the pressure values output by the front pressure sensor 21 and the rear pressure sensor 22 is repeated. If the first comparison value is still less than 0.95, the seat 1 is adjusted backward for another and yet another 1 cm until the first comparison value is greater than or equal to 0.95.

When the first comparison value is greater than 1.05, the seat 1 is adjusted forward for a certain distance, 1 cm for example. Next, the step of obtaining the pressure values output by the front pressure sensor 21 and the rear pressure sensor 22 is repeated. If the first comparison value is still greater than 1.05, the seat 1 needs to be adjusted forward for another and yet another 1 cm until the first comparison value is less than or equal to 1.05.

Figure 5:
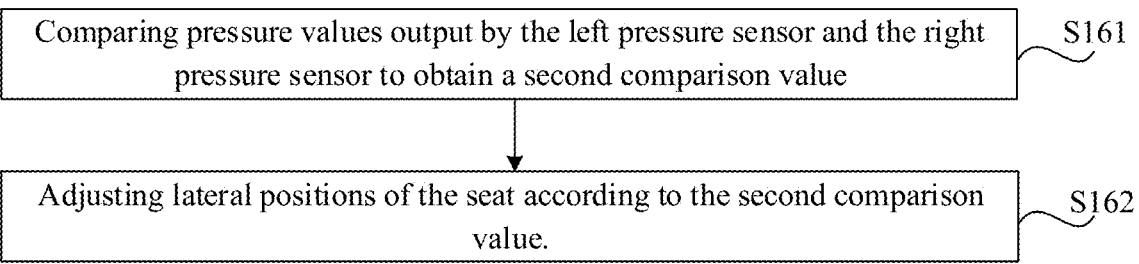
FIG. 5 is a flowchart showing adjusting lateral positions of a seat included in a method for adjusting the position of a seat in a vehicle shown according to an exemplary embodiment.

FIG. 5 is a flowchart showing adjusting lateral positions of a seat included in a method for adjusting the position of a seat in a vehicle according to an exemplary embodiment. As illustrated by FIG. 5, the adjusting lateral positions of the seat 1 according to the pressure values output by the left pressure sensor 23 and the right pressure sensor 24 comprises the following steps:

Step S161: comparing with the pressure values output by the left pressure sensor 23 and the right pressure sensor 24 to obtain a second comparison value; and Step S162: adjusting lateral positions of the seat 1 according to the second comparison value.

The second comparison value is equal to a ratio of the pressure value output by the left pressure sensor 23 to the pressure value output by the right pressure sensor 24. In Step S162: the adjusting lateral positions of the seat 1 according to the second comparison value may comprise: maintaining a current position of the seat 1 in the left-right direction when the second comparison second is greater than or equal to a rightward-adjusting threshold and less than or equal to a leftward-adjusting threshold; controlling the seat 1 to move left when the second comparison value is greater than the leftward-adjusting threshold; controlling the seat 1 to move right when the second comparison value is less than the rightward-adjusting threshold. The rightward-adjusting threshold may range from 0.85 to 0.99 and the forward-adjusting threshold may range from 1.00 to 1.15. Preferably, the rightward-adjusting threshold is 0.95 and the leftward-adjusting threshold is 1.05.

For instance, when the second comparison value is greater than or equal to 0.95 and less than or equal to 1.05, a lateral position of the seat 1 may be considered to be so appropriate that there is no need to adjust the lateral position of seat 1.

When the second comparison value is less than 0.95, the seat is adjusted to the right for a certain distance, 1 cm for example. Next, the step of obtaining the pressure values output by the left pressure sensor 23 and the right pressure sensor 24 is repeated. If the second comparison value is still less than 0.95, the seat 1 is adjusted to the right for another and yet another 1 cm until the second comparison value is greater than or equal to 0.95.

When the second comparison value is greater than 1.05, the seat 1 is adjusted to the left for a certain distance, 1 cm for example. Next, the step of obtaining the pressure values output by the left pressure sensor 23 and the right pressure sensor 24 is repeated. If the second comparison value is still greater than 1.05, the seat 1 is adjusted to the left for another and yet another 1 cm until the second comparison value is less than or equal to 1.05.

Optionally, the controlling the seat 1 to move left when the second comparison value is greater than the leftward-adjusting threshold may comprise: outputting a first prompt message which is used to prompt a user sitting on the seat 1 to move right; judging whether the second comparison value changes in a first preset period (2 s for example); controlling the seat 1 to move left when the second comparison value does not change in the first preset period.

Optionally, the controlling the seat 1 to move right when the second comparison value is less than the rightward-adjusting threshold may comprise: outputting a second prompt message which is used to prompt a user sitting on the seat 1 to move left; judging whether the second comparison value changes in a second preset period (2 s for example); and controlling the seat 1 to move right when the second comparison value does not change in the second preset period.

The first or the second prompt message may be a voice reminder displayed through speakers, or a text or icon displayed on display screens for reminding. By prompting a user to move left or right with output prompt messages, a step of controlling the seat 1 to move left or right is no longer needed when the user makes an active movement to above directions. Of course, the seat 1 still needs to be adjusted leftwards or rightwards when the user does not move left or right in a first or a second preset period. In this way, the method for adjusting positions of the vehicle seat 1, as disclosed in the present disclosure, is more automatic and intelligent.

Figure 6:
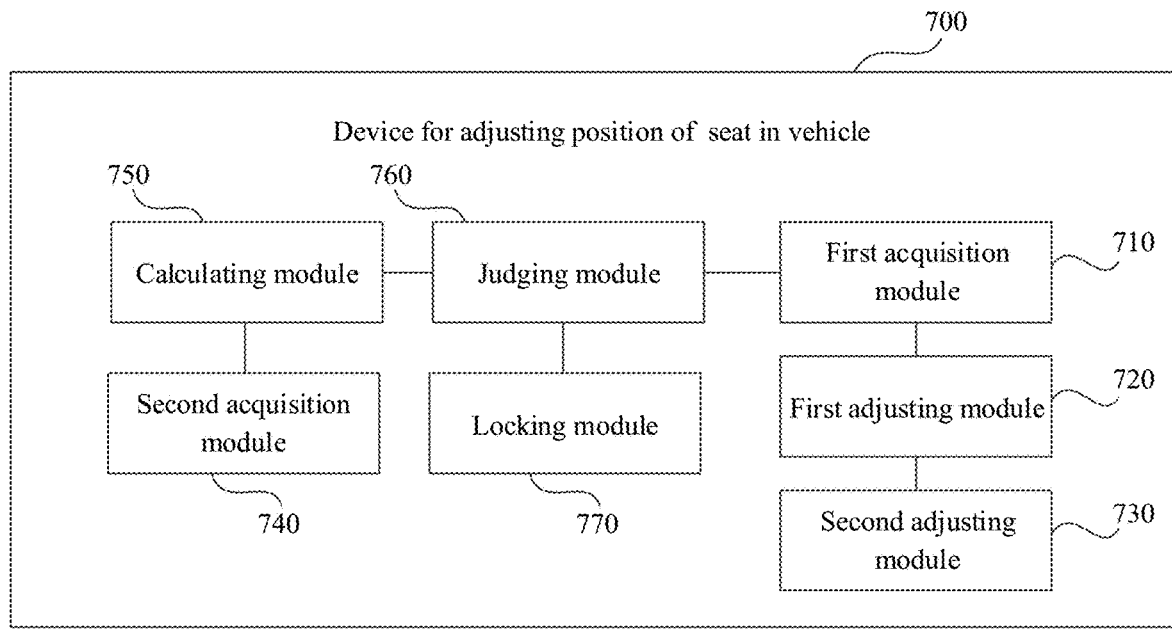
FIG. 6 is a block diagram of a device for adjusting the position of a seat in a vehicle shown in accordance with an exemplary embodiment.

FIG. 6 is a block diagram of a device for adjusting the position of a seat in a vehicle shown in accordance with an exemplary embodiment. With reference to FIG. 6, the front, rear, left and right parts of a face of the seat are respectively provided with a front pressure sensor, a rear pressure sensor, a left pressure sensor and a right pressure sensor. A center area of the seat face is also provided with a pressure sensor ring which comprises a plurality of sub-sensors distributed in a circular manner. The device 700 comprises:

a second acquisition module 740 for obtaining pressure values output by the sub-sensors;

a calculating module 750 for calculating a mean square value and an average value of the pressure values output by the sub-sensors;

a judging module 760 for judging whether a ratio of the mean square value to the average value is greater than a preset value;

a first acquisition module 710 for obtaining pressure values output by the front pressure sensor, the rear pressure sensor, the left pressure sensor and the right pressure sensor when a ratio of the mean square value to the average value is greater than a preset value;

a first adjusting module 720 for adjusting fore-and-aft positions of the seat according to pressure values output by the front pressure sensor and the rear pressure sensor; and a second adjusting module 730 for adjusting lateral positions of the seat according to pressure values output by the left pressure sensor and the right pressure sensor.

Figure 7:
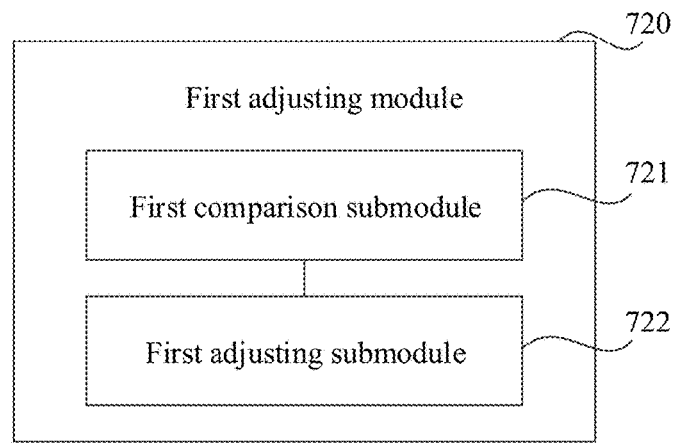
FIG. 7 is a block diagram of a first adjusting module of a device for adjusting the position of a seat in a vehicle in accordance with an exemplary embodiment.

Optionally, as shown in FIG. 7, the first adjusting module 720 comprises:

a first comparison submodule 721 for comparing pressure values output by the front pressure sensor and the rear pressure sensor to obtain a first comparison value; and a first adjusting submodule 722 which adjusts fore-and-aft positions of the seat according to the first comparison value.

Optionally, the first comparison value is equal to a ratio of the pressure value output by the front pressure sensor to the pressure value output by the rear pressure sensor;

the first adjusting submodule 722 is specifically used for:

maintaining a current position of the seat in the front-rear direction when the first comparison value is greater than or equal to a backward-adjusting threshold and less than or equal to a forward-adjusting threshold;

controlling the seat to move backward when the first comparison value is less than the backward-adjusting threshold; and controlling the seat to move forward when the first comparison value is greater than the forward-adjusting threshold.

Figure 8:
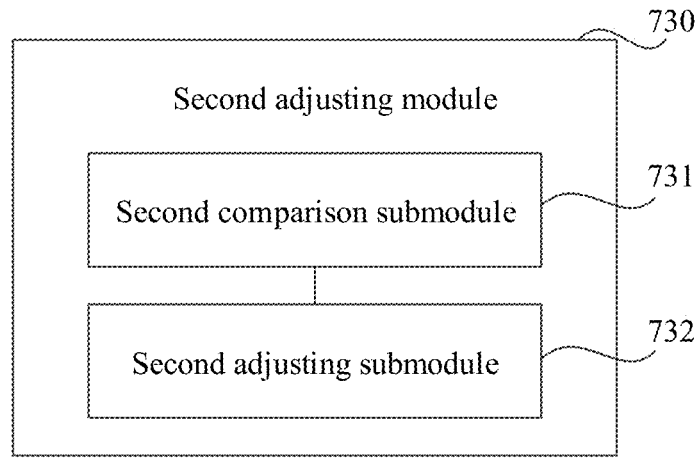
FIG. 8 is a block diagram of a second adjusting module of a device for adjusting the position of a seat in a vehicle in accordance with an exemplary embodiment.

Optionally, as shown in FIG. 8, the second adjusting module 730 comprises:

a second comparison submodule 731 for comparing the pressure values output by the left pressure sensor and the right pressure sensor to obtain a second comparison value; and a second adjusting submodule 732 for adjusting lateral positions of the seat according to the second comparison value.

Optionally, the second comparison value is equal to a ratio of a pressure value output by the left pressure sensor to a pressure value output by the right pressure sensor;

the second adjusting submodule 732 is specifically used for:

maintaining a current position of the seat in the left-right direction when the second comparison value is greater than or equal to a rightward-adjusting threshold and less than or equal to a leftward-adjusting threshold;

controlling the seat to move left when the second comparison value is greater than the leftward-adjusting threshold; and controlling the seat to move right when the second comparison value is less than the rightward-adjusting threshold.

Figure 9:
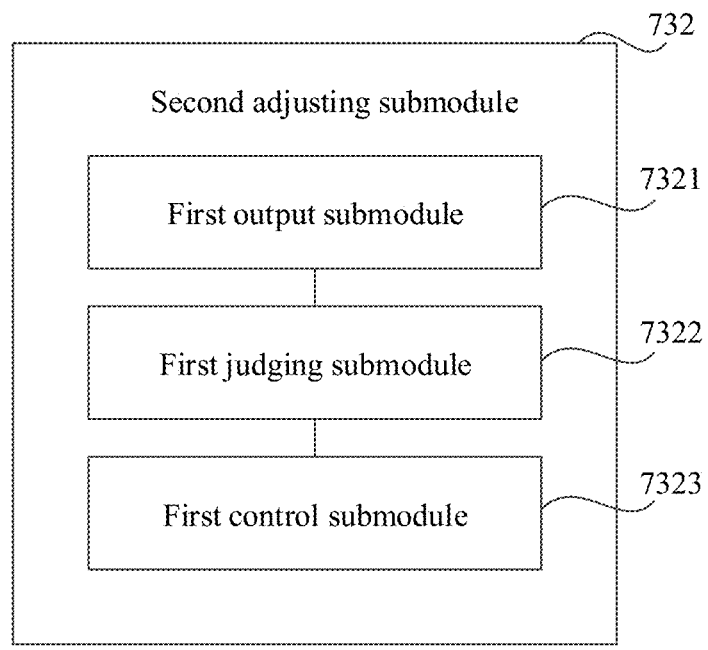
FIG. 9 is a block diagram of the second adjusting submodule in FIG. 8.

Optionally, as shown in FIG. 9, the second adjusting submodule 732 comprises:

a first output submodule 7321 for outputting a first prompt message which is used to prompt a user sitting on the seat to move right when the second comparison value is greater than the leftward-adjusting threshold;

a first judging submodule 7322 for judging whether the second comparison value changes in a first preset period; and a first control submodule 7323 for controlling the seat to move left when the second comparison value does not change during the first preset period.

Figure 10:
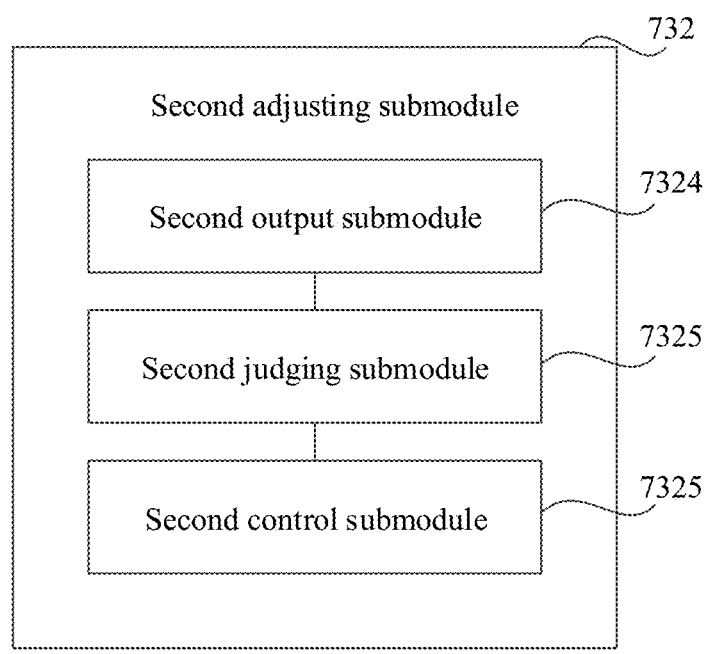
FIG. 10 is another block diagram of the second adjusting submodule in FIG. 8.

Optionally, as shown in FIG. 10, the second adjusting submodule 732 comprises:

a second output submodule 7324 for outputting a second prompt message which is used to prompt a user sitting on the seat to move left when the second comparison value is less than the rightward-adjusting threshold;

a second judging submodule 7325 for judging whether the second comparison value changes in a second preset period; and a second control submodule 7326 for controlling the seat to move right when the second comparison value does not change in the second preset period.

Optionally, as shown in FIG. 6, the device 700 comprises:

a locking module 770 for locking a position of a seat when a ratio of the mean square value to the average value is less than or equal to the preset value so that the seat does not move.

With regard to the device 700 for positions of a vehicle seat in the above embodiment, the specific manner that each module performs an operation has been described in detail in embodiments of the method, and will not be elaborated here.

The preferred embodiments of the present disclosure are described in detail above in conjunction with the accompanying drawings. However, the present disclosure is not limited to the specific details of the above-mentioned embodiments. Within the scope of the technical concept disclosed herein, a variety of simple variants of the technical solution of the present disclosure may be made, and all the variations fall within the scope of protection of the present disclosure.

It should be further noted that the specific technical features described in the above specific embodiments may be combined in any appropriate way without conflicts. In order to avoid unnecessary repetition, various possible combinations are not described separately in the present disclosure.

In addition, any combination of the various embodiments of the present disclosure may also be made, as long as the combination does not violate the ideas of the present disclosure, and the combination shall likewise be regarded as the content disclosed in the present disclosure.

The invention claimed is:

1. A method for adjusting a position of a seat in a vehicle, wherein front, rear, left, right and central areas of a seat face are respectively provided with a front pressure sensor, a rear pressure sensor, a left pressure sensor, a right pressure sensor, and a pressure sensor ring which comprises a plurality of sub-sensors distributed in a circular manner; the method comprises:

obtaining pressure values output by the sub-sensors;

calculating a mean square value and an average value of the pressure values output by the sub-sensors;

judging whether a ratio of the mean square value to the average value is greater than a preset value;

obtaining pressure values output by the front pressure sensor, the rear pressure sensor, the left pressure sensor and the right pressure sensor when the ratio of the mean square value to the average value is greater than the preset value;

adjusting fore-and-aft positions of the seat according to the pressure values output by the front pressure sensor and the rear pressure sensor; and adjusting lateral positions of the seat according to the pressure values output by the left pressure sensor and the right pressure sensor.

2. The method as claimed in claim 1, wherein the adjusting fore-and-aft positions of the seat according to the pressure values output by the front pressure sensor and the rear pressure sensor comprises:

comparing the pressure values output by the front pressure sensor and the rear pressure sensor to obtain a first comparison value; and adjusting fore-and-aft positions of the seat according to the first comparison value.

3. The method as claimed in claim 2, wherein the first comparison value is equal to a ratio of the pressure value output by the front pressure sensor to the pressure value output by the rear pressure sensor; and the adjusting fore-and-aft positions of the seat according to the first comparison value comprises:

maintaining a current position of the seat in the front-rear direction when the first comparison value is greater than or equal to a backward-adjusting threshold and less than or equal to a forward-adjusting threshold;

controlling the seat to move backward when the first comparison value is less than the backward-adjusting threshold; and controlling the seat to move forward when the first comparison value is greater than the forward-adjusting threshold.

4. The method as claimed in claim 1, wherein the adjusting lateral positions of the seat according to the pressure values output by the left pressure sensor and the right pressure sensor comprises:

comparing the pressure values output by the left pressure sensor and the right pressure sensor to obtain a second comparison value; and adjusting lateral positions of the seat according to the second comparison value.

5. The method as claimed in claim 4, wherein the second comparison value is equal to a ratio of the pressure value output by the left pressure sensor to the pressure value output by the right pressure sensor; and the adjusting lateral positions of the seat according to the second comparison value comprises:

maintaining a current position of the seat in the left-right direction when the second comparison value is greater than or equal to a rightward-adjusting threshold and less than or equal to a leftward-adjusting threshold;

controlling the seat to move left when the second comparison value is greater than the leftward-adjusting threshold; and controlling the seat to move right when the second comparison value is less than the rightward-adjusting threshold.

6. The method as claimed in claim 5, wherein the controlling the seat to move left when the second comparison value is greater than the leftward-adjusting threshold comprises:

outputting a first prompt message which is used to prompt a user sitting on the seat to move right;

judging whether the second comparison value changes in a first preset period; and controlling the seat to move left when the second comparison value does not change in the first preset period.

7. The method as claimed in claim 5, wherein the controlling the seat to move right when the second comparison value is less than the rightward-adjusting threshold comprises:

outputting a second prompt message which is used to prompt a user sitting on the seat to move left;

judging whether the second comparison value changes in a second preset period; and controlling the seat to move right when the second comparison value does not change in the second preset period.

8. The method as claimed in claim 1, further comprising:

locking a position of a seat when a ratio of the mean square value to the average value is less than or equal to the preset value so that the seat does not move.

9. A device for adjusting a position of a seat in a vehicle, wherein front, rear, left, right and central areas of a seat face are respectively provided with a front pressure sensor, a rear pressure sensor, a left pressure sensor, a right pressure sensor and a pressure sensor ring which comprises a plurality of sub-sensors distributed in a circular manner; the device comprises:

a second acquisition module for obtaining pressure values output by the sub-sensors;

a calculating module for calculating a mean square value and an average value of the pressure values output by the sub-sensors;

a judging module for judging whether a ratio of the mean square value to the average value is greater than a preset value;

a first acquisition module for obtaining pressure values output by the front pressure sensor, the rear pressure sensor, the left pressure sensor and the right pressure sensor when a ratio of the mean square value to the average value is greater than a preset value;

a first adjusting module for adjusting fore-and-aft positions of the seat according to the pressure values output by the front pressure sensor and the rear pressure sensor; and a second adjusting module for adjusting lateral positions of the seat according to the pressure values output by the left pressure sensor and the right pressure sensor.

10. The device as claimed in claim 9, wherein the first adjusting module comprises:

a first comparison submodule for comparing the pressure values output by the front pressure sensor and the rear pressure sensor to obtain a first comparison value; and a first adjusting submodule for adjusting fore-and-aft positions of the seat according to the first comparison value.

11. The device as claimed in claim 10, wherein the first comparison value is equal to a ratio of the pressure value output by the front pressure sensor to the pressure value output by the rear pressure sensor; and the first adjusting submodule is specifically used for:

maintaining a current position of the seat in the front-rear direction when the first comparison value is greater than or equal to a backward-adjusting threshold and less than or equal to a forward-adjusting threshold;

controlling the seat to move backward when the first comparison value is less than the backward-adjusting threshold; and controlling the seat to move forward when the first comparison value is greater than the forward-adjusting threshold.

12. The device as claimed in claim 9, wherein the second adjusting module comprises:

a second comparison submodule for comparing the pressure values output by the left pressure sensor and the right pressure sensor to obtain a second comparison value; and a second adjusting submodule for adjusting lateral positions of the seat according to the second comparison value.

13. The device as claimed in claim 12, wherein the second comparison value is equal to a ratio of the pressure value output by the left pressure sensor to the pressure value output by the right pressure sensor; and the second adjusting submodule is specifically used for:

maintaining a current position of the seat in the left-right direction when the second comparison value is greater than or equal to a rightward-adjusting threshold and less than or equal to a leftward-adjusting threshold;

controlling the seat to move left when the second comparison value is greater than the leftward-adjusting threshold; and controlling the seat to move right when the second comparison value is less than the rightward-adjusting threshold.

14. The device as claimed in claim 13, wherein the second adjusting submodule comprises:

a first output submodule for outputting a first prompt message which is used to prompt a user sitting on the seat to move right when the second comparison value is greater than the leftward-adjusting threshold;

a first judging submodule for judging whether the second comparison value changes in a first preset period; and a first control submodule for controlling the seat to move left when the second comparison value does not change during the first preset period.

15. The device as claimed in claim 13, wherein the second adjusting submodule comprises:

a second output submodule for outputting a second prompt message which is used to prompt a user sitting on the seat to move left when the second comparison value is less than the rightward-adjusting threshold;

a second judging submodule for judging whether the second comparison value changes in a second preset period; and a second control submodule for controlling the seat to move right when the second comparison value does not change in the second preset period.

16. The device as claimed in claim 9, wherein the device further comprises:

a locking module for locking a position of a seat when a ratio of the mean square value to the average value is less than or equal to the preset value so that the seat does not move.

* * * * *